(12) United States Patent
Otsuki

(10) Patent No.: US 6,200,035 B1
(45) Date of Patent: Mar. 13, 2001

(54) HYDRODYNAMIC GAS BEARING STRUCTURE

(75) Inventor: Makoto Otsuki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/392,092

(22) Filed: Sep. 8, 1999

(30) Foreign Application Priority Data

Sep. 10, 1998 (JP) .................................................... 10-256222

(51) Int. Cl.[7] ....................................................... F16C 17/04
(52) U.S. Cl. ................................................. 384/123; 384/112
(58) Field of Search ........................................ 384/123, 112, 384/121, 124, 107

(56) References Cited

FOREIGN PATENT DOCUMENTS

| 63-219912 | 9/1988 | (JP) . |
|---|---|---|
| 03181612 | 8/1991 | (JP) . |
| 5-73313 | 10/1993 | (JP) . |
| 07073577 | 3/1995 | (JP) . |
| 07156060 | 6/1995 | (JP) . |
| 08200353 | 8/1996 | (JP) . |
| 09126229 | 5/1997 | (JP) . |
| 09318900 | 12/1997 | (JP) . |

Primary Examiner—Lenard A. Footland
(74) Attorney, Agent, or Firm—W. F. Fasse; W. G. Fasse

(57) ABSTRACT

A hydrodynamic gas bearing structure includes a fixed shaft, a hollow cylindrical sleeve opposing to the fixed shaft with a radial space kept therebetween, and a thrust plate having an opposing surface opposing to an end surface in the axial direction of the sleeve. The opposing surface of the thrust plate has a groove for generating dynamic pressure between the sleeve and the thrust plate, a protruded portion formed at an inner peripheral portion, and a recessed portion formed shallower than the groove, extending from the protruded portion toward an outer peripheral portion. Top surface of the protruded portion is at a position of a first height from the bottom of the recessed portion, and the outer peripheral portion of the opposing surface includes a portion at a position of a second height lower than the first height from the bottom of the recessed portion.

8 Claims, 6 Drawing Sheets

HYDRODYNAMIC GAS BEARING STRUCTURE

BACKGROUND OF THE INVENTION

1. Field of the Invention

The present invention generally relates to a hydrodynamic gas bearing structure and, more specifically, to a hydrodynamic gas bearing structure used for a motor of a magnetic recording apparatus such as a hard disc, or of a magneto-optical recording apparatus.

2. Description of the Background Art

Recently, high rotational accuracy as well as high rotation speed have been required of a rotation driving part of a magnetic recording apparatus, for example. In order to rotate at a high speed a precision motor of which such high rotational speed and the high rotational accuracy are required, use of a hydrodynamic gas bearing in the rotation driving part has been proposed. In the rotational driving part using the hydrodynamic gas bearing, when a rotor rotates, air is forced at least into a gap between a radial type gas bearing body and the rotor. Accordingly, air pressure in the gap is increased, and the rotor rotates at high speed through the hydrodynamic gas bearing. Thus, by the use of the hydrodynamic gas bearing, it is expected that the rotational accuracy can be maintained even during high speed rotation.

Conventionally, various methods for controlling position of the rotor in a thrust direction has been proposed for this type of hydrodynamic gas bearing structure.

As a method of controlling the position of the rotor in the thrust direction, a method has been proposed in which two opposing thrust plates are provided above and below the rotor, whereby the position of the rotor is regulated from above and from below.

In another proposal, an attracting force between a yoke and a magnet of the motor is utilized to press the rotor to a pair of thrust plates, so as to control the position of the rotor in the thrust direction.

In an apparatus using such a hydrodynamic gas bearing as described above in the rotation driving part, a design allowing repetitive starting/stopping of rotation frequently is desired to reduce power consumption.

When rotation is started with an entire surface of the thrust plate provided for controlling the position in the thrust direction being in tight contact with the rotor, rotation torque of the motor necessary for starting increases, resulting in increased power consumption. In order to meet the large rotation torque, it becomes necessary to enlarge the size of a magnet coil of the motor. This does not meet the demand of reduced size of the apparatus.

In order to solve these problems, Japanese Patent Laying-Open No. 9-126229 proposes a method in which surface roughness of contact portions between the rotor and the radial bearing and between the rotor and the thrust bearing constituting the hydrodynamic gas bearing, is increased to enable smooth starting of rotation and to reduce time necessary for starting. Even when this method is adopted, however, the rotation torque necessary for starting rotation cannot sufficiently be made small.

Japanese Utility Model Laying-Open No. 5-73313 discloses a structure of a hydrodynamic gas bearing apparatus employing a pivot type bearing portion in place of the hydrodynamic bearing, as a bearing body in the thrust direction. According to this method, when the rotor is stationary, the rotor is supported by point contact, and therefore only an extremely small rotation torque is necessary to start rotation.

When the pivot type bearing portion is employed, however, the rotor is kept in contact with the bearing portion during rotation, and therefore the bearing portion wears because of high speed rotation. Even in an oil bearing apparatus employing a pivot type bearing portion, the bearing portion degrades as the temperature of oil increases, and oil scatters.

Therefore, this type of bearing apparatus is not suitable for high speed rotation, either.

In the hydrodynamic gas bearing apparatus utilizing the attracting force between the torque and the magnet of the motor to control position of the rotor in the thrust direction, sometimes it is the case that the symmetry thereof is unsatisfactory, resulting in a constant moment causing inclination of the rotor with respect to the bearing portion. This results in larger torque when starting rotation, and thus life of the hydrodynamic bearing becomes shorter.

It is possible to reduce torque for starting rotation, when a protruded portion is formed on an inner periphery of the thrust plate. In that case, a dynamic pressure generates as the number of rotation increases, generating a repulsive force between the protruded portion of the thrust plate and the rotor. When the height of the protruded portion is high, the generated dynamic pressure is small, and therefore, even when the rotor is rotated at a high speed, the protruded portion of the thrust plate is kept in contact with the rotor. This results in local friction heat at the contact portion, increasing temperature and causing wear at the contact portion.

Therefore, the height of the protruded portion should desirably be as small as possible. By forming a small protruded portion either on an end surface of the rotor or an inner surface of a housing opposing to the end surface, constituting the thrust hydrodynamic gas bearing, it is possible to start rotation of the rotor easily with a small driving force, as described in Japanese Patent Laying-Open No. 9-318900.

When the height of the protruded portion is reduced to such an extent that the height of the protruded portion is within the range of general unevenness existing on the surface of the thrust plate, the uneven protruded portions existing on the surface of the thrust plate would be in contact with the rotor. Therefore, if such a thrust plate is to be manufactured, it is necessary to process the surface of the inner periphery to be flat, except for the small protruded portion, which process undesirably increases manufacturing cost. Though it is possible to form the protruded portion as a separate member from the thrust plate, the number of manufacturing steps is increased, resulting in increase manufacturing cost.

SUMMARY OF THE INVENTION

Therefore, an object of the present invention is to provide a thrust hydrodynamic bearing structure which allows reduction of torque for starting rotation and reduction of floating rotational number so as to prevent wear of portions which are in contact at the time of activation.

A further object of the present invention is to provide a thrust hydrodynamic gas bearing structure which allows reduction of torque for starting rotation, prevents wear of portions which are in contact at the time of starting, which can be manufactured easily at a low cost.

The hydrodynamic gas bearing structure in accordance with the present invention includes a shaft body, a hollow cylindrical bearing body opposing to the shaft body with a space kept in radial direction therebetween, and a plate-shaped member having an opposing surface opposing to an end surface in axial direction of one of the shaft body and the bearing body. The opposing surface of the plate-shaped member has a groove for generating dynamic pressure between one of the shaft body and the bearing body and the plate-shaped member, a protruded portion formed on an inner peripheral portion, and a recessed portion formed shallower than the groove, extending from the protruded portion toward an outer peripheral portion. A top surface of the protruded portion is at a position of a first height from the bottom of the recessed portion. The outer peripheral portion of the opposing surface includes a portion which is at a position of a second height lower than the first height, from the bottom of the recessed portion.

When the opposing surface of the plate-shaped member is formed as described above, only the protruded portion formed on the inner peripheral portion is brought into contact with one of the shaft body or the bearing body, when the rotor is in a stationary state. The recessed portion extending toward the outer peripheral portion of the opposing surface of the plate-shaped member is not in contact with one of the shaft body or the bearing body, when the rotor is stationary. Therefore, it becomes possible to reduce rotation torque necessary for starting when rotation is to be started, and in addition, as the space formed between the recessed portion positioned at the outer peripheral portion of the opposing surface of the plate-shaped member and one of the shaft body and the bearing body is small, dynamic pressure is generated at portions other than the groove. As a result, when the rotation starts, the plate-shaped member floats from the opposing shaft body or the bearing body, at a small number of rotation. Therefore, wear of the protruded portion formed on the inner peripheral portion of the plate-shaped member can be prevented.

Further, the protruded portion positioned on the inner peripheral portion of the plate-shaped member and the recessed portion shallower than the groove and extending from the protruded portion toward the outer peripheral portion can be formed in the similar manner with the groove, by using laser processing, blasting or etching, in the step of forming the groove for generating the dynamic pressure. When reactive ion etching is utilized, the protruded portion and the recessed portion mentioned above can be formed with high precision simultaneously with the dynamic pressure generating groove, by introducing an etching gas to an opening of a mask, with the mask used for forming the groove provided at a position separate from the surface of the plate-shaped member. Thus, by the same method as the method of forming dynamic pressure generating groove, the protruded and recessed portions which can reduce the torque for starting rotation and prevent wear during rotation can be formed. Thus, the hydrodynamic gas bearing structure in accordance with the present invention can be manufactured easily at a low cost.

In the hydrodynamic gas bearing structure in accordance with the present invention, an end surface in the axial direction of the bearing body may oppose to the opposing surface position at the outer peripheral portion of the plate-shaped member, and an end surface of the axial direction of the shaft body may be attached to the plate-shaped member at a surface positioned close to the inner peripheral side, than the opposing surface.

Alternatively, the end surface of the axial direction of the shaft body may oppose to the opposing surface positioned at the inner peripheral portion of the plate-shaped member, and the end surface of the axial direction of the bearing body may be attached to the plate-shaped member at a surface position close to the outer peripheral side than the opposing surface.

The hydrodynamic gas bearing structure in accordance with the present invention may be applicable to a structure in which either the shaft body or the bearing body rotates, while it is preferred that the shaft body is fixed and the bearing body rotates.

The groove for generating dynamic pressure is preferably formed in plural aligned in the peripheral direction on the opposing surface of the plate-shaped member, with the aforementioned recessed portion formed between the plurality of grooves.

In the hydrodynamic gas bearing structure in accordance with the present invention, the plate-shaped member should preferably be formed of ceramics. More preferably, silicon nitride or alumina is used as the ceramics.

As described above, by the present invention, separate from the groove for generating thrust dynamic pressure, a protruded portion and a recessed portion of limited shapes are formed on the plate-shaped member opposing to an end surface of one of the shaft body or the bearing body, whereby the torque necessary for starting rotation can be reduced, and the floating rotation number can be reduced. Thus, wear of the opposing surface of the plate-shaped member which is brought into contact at the time of starting can be prevented.

Further, when the opposing surface of the plate-shaped member is formed, the groove for generating dynamic pressure and the protruded portion and the recessed portion can be formed simultaneously. Therefore, the hydrodynamic gas bearing structure of the present invention can be manufactured easily at a low cost.

Further, as the plate-shaped member is formed of ceramics such as silicon nitride or alumina, a structure which can withstand the wear at the time of starting rotation can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
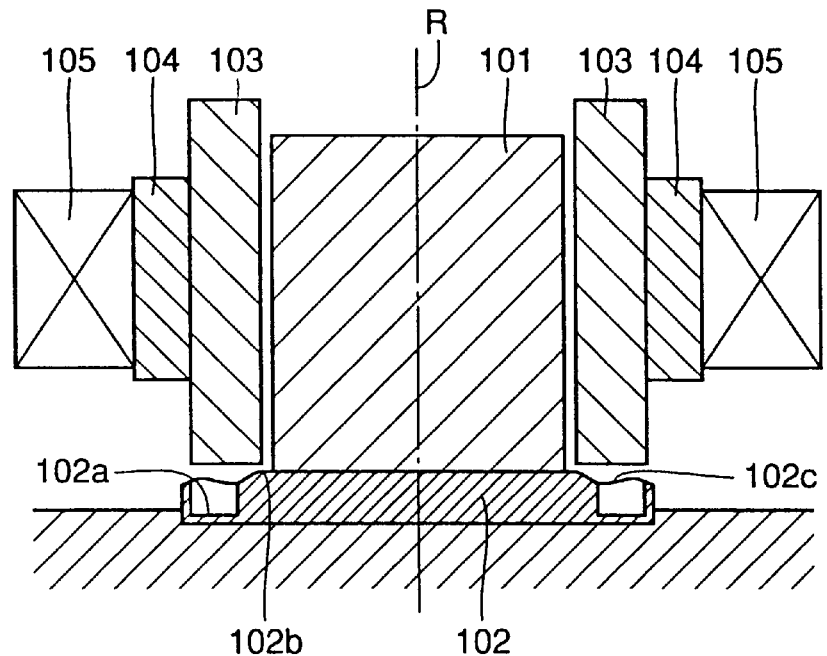
FIG. 1 is a schematic vertical cross section of the hydrodynamic gas bearing structure in accordance with a first embodiment of the present invention.

As can be seen in FIG. 1, the hydrodynamic gas bearing structure includes a fixed shaft 101 as the shaft body, and a sleeve 103 as a hollow cylindrical bearing body arranged opposing to fixed shaft 101 with a radial space kept therebetween. A thrust plate 102 as the plate-shaped member is attached to fixed shaft 101. A rotation member 104 is attached to an outer peripheral surface of sleeve 103. A rotational load 105 is provided on rotation member 104. Sleeve 103 rotates about fixed shaft 101 with the axial line R being the center. One end surface of sleeve 103 opposes to an end surface of thrust plate 102 positioned at an outer peripheral portion. On the end surface positioned at the outer peripheral portion of thrust plate 102, a groove 102a for generating dynamic pressure, a protruded portion 102b, and a recessed portion 102c are formed.

Figure 3:
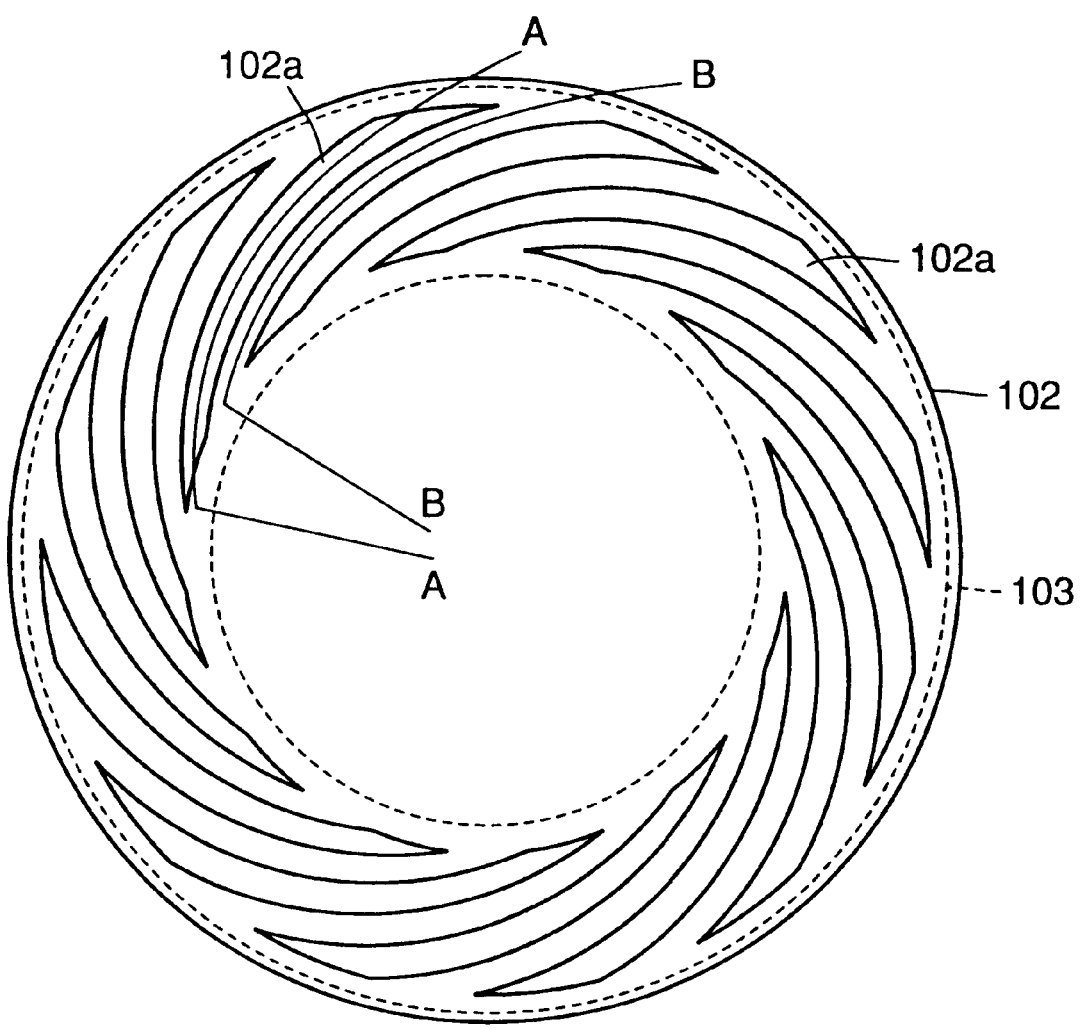
FIG. 3 is a plan view showing that surface of the thrust plate which opposes to a sleeve in the hydrodynamic gas bearing structure shown in FIG. 1.

FIG. 3 is a plan view showing that surface of thrust plate 102 which opposes to one end surface of sleeve 103.

As can be seen in FIG. 3, the region of the thrust plate 102 which opposes to sleeve 103 is shown as a ring-shaped region represented by the dotted lines. On the surface of thrust plate 102 in the region opposing to sleeve 103, that is, on the opposing surface, there are a plurality of grooves 102a formed arranged in the peripheral direction, for generating thrust dynamic pressure. Between the plurality of grooves 102a, recessed portions shallower than the grooves are formed.

Figure 4A:
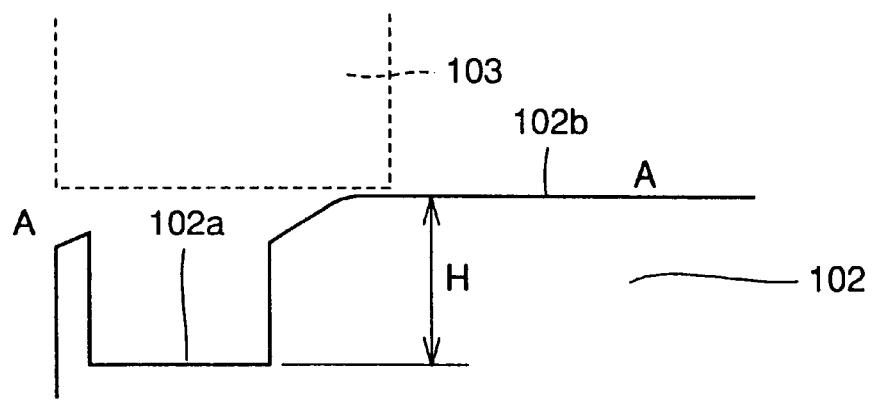
FIG. 4A is a cross section taken along the line A—A of FIG. 3.

Referring to FIG. 4A, a groove 102a is formed on the surface of thrust plate 102 opposing to sleeve 103. The surface of the central portion (inner peripheral portion) of thrust plate 102 is formed to be higher.

Figure 4B:
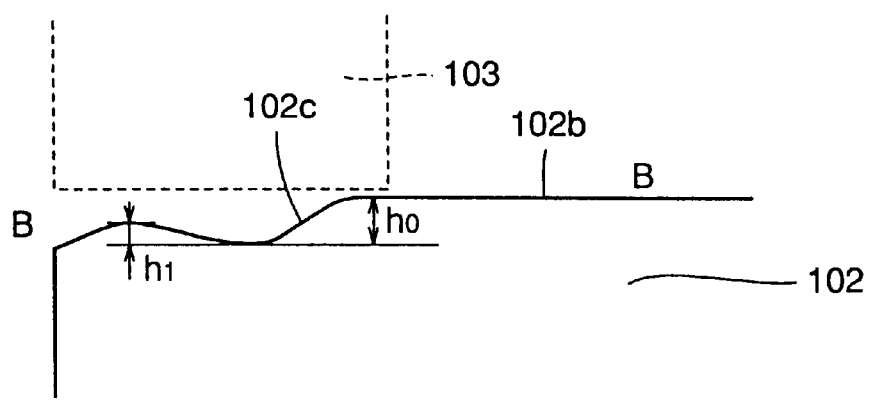
FIG. 4B is a cross section taken along the line B—B of FIG. 3.

Referring to FIG. 4B, in the region of thrust plate 102 where the dynamic pressure generating groove is not formed, there are the protruded portion 102b and the recessed portion 102c. The protruded portion 102b is positioned on the inner peripheral portion of thrust plate 102, while the recessed portion 102c is positioned on the outer peripheral portion. The surface of the thrust plate 102 opposing to sleeve 103, that is, the opposing surface, has the protruded portion 102b formed on the inner peripheral portion, and the recessed portion 102c extending from the protruded portion 102b toward the outer peripheral portion. The recessed portion 102c is formed shallower than the dynamic pressure generating groove 102a. The top surface of the protruded portion 102b is at a position of a first height $h_0$ from the bottom of recessed portion 102c. On the outer peripheral portion of the opposing surface, there is a portion formed at a position of a second height $h_1$ lower than the first height $h_0$, from the bottom of the recessed portion 102c.

As the protruded portion 102b and the recessed portion 102c are formed in the above described manner, only the protruded portion 102b of thrust plate 102 is in contact with sleeve 103 in the stationary state. When rotation is to be started, dynamic pressure is generated as the space between the portion of the second height $h_1$ and sleeve 103 is small at the outer peripheral portion of thrust plate 102, so that sleeve 103 starts floating above thrust plate 102 at a low rotational number. In this case, the torque necessary for starting rotation can be reduced by the protruded portion 102b. As it is possible to float sleeve 103 above thrust plate 102 with a small number of rotation, wear of the protruded portion 102b at the central portion (inner peripheral portion) can be prevented.

Though grooves in the spiral shape are formed as grooves for generating thrust dynamic pressure for thrust plate 102, grooves of other shapes may be used, provided that the thrust dynamic pressure can be generated. Further, in order to generate dynamic pressure in radial direction, a groove for generating dynamic pressure may be formed on at least one of the outer peripheral surface of fixed shaft 101 or an inner peripheral surface of sleeve 103.

Second Embodiment

Figure 2:
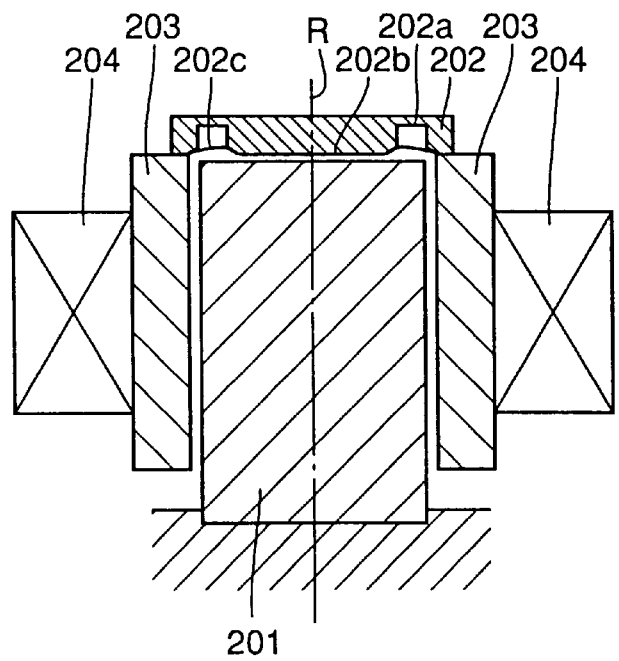
FIG. 2 is a schematic vertical cross section of the hydrodynamic gas bearing structure in accordance with a second embodiment of the present invention.

As can be seen in FIG. 2, the hydrodynamic gas bearing structure includes a fixed shaft 201 as the shaft body, and a sleeve 203 as a hollow cylindrical bearing body opposing to the fixed shaft 201 with a radial space kept therebetween. On one end surface of sleeve 203, an outer peripheral portion of a thrust plate 202 as the plate-shaped member is attached. A rotational load 204 is provided on an outer peripheral surface of sleeve 203. Sleeve 203 is arranged to rotate about fixed shaft 201 with the axial line R being the center. On an end surface positioned at the inner peripheral portion of thrust plate 202 opposing to one end surface of fixed shaft 201, that is, on the opposing surface, a groove 202a for generating thrust dynamic pressure, a protruded portion 202b positioned on an inner peripheral portion, and a recessed portion 202c shallower than the grooves, extending from the protruded portions 202b toward the outer peripheral portion, are formed.

Figure 5:
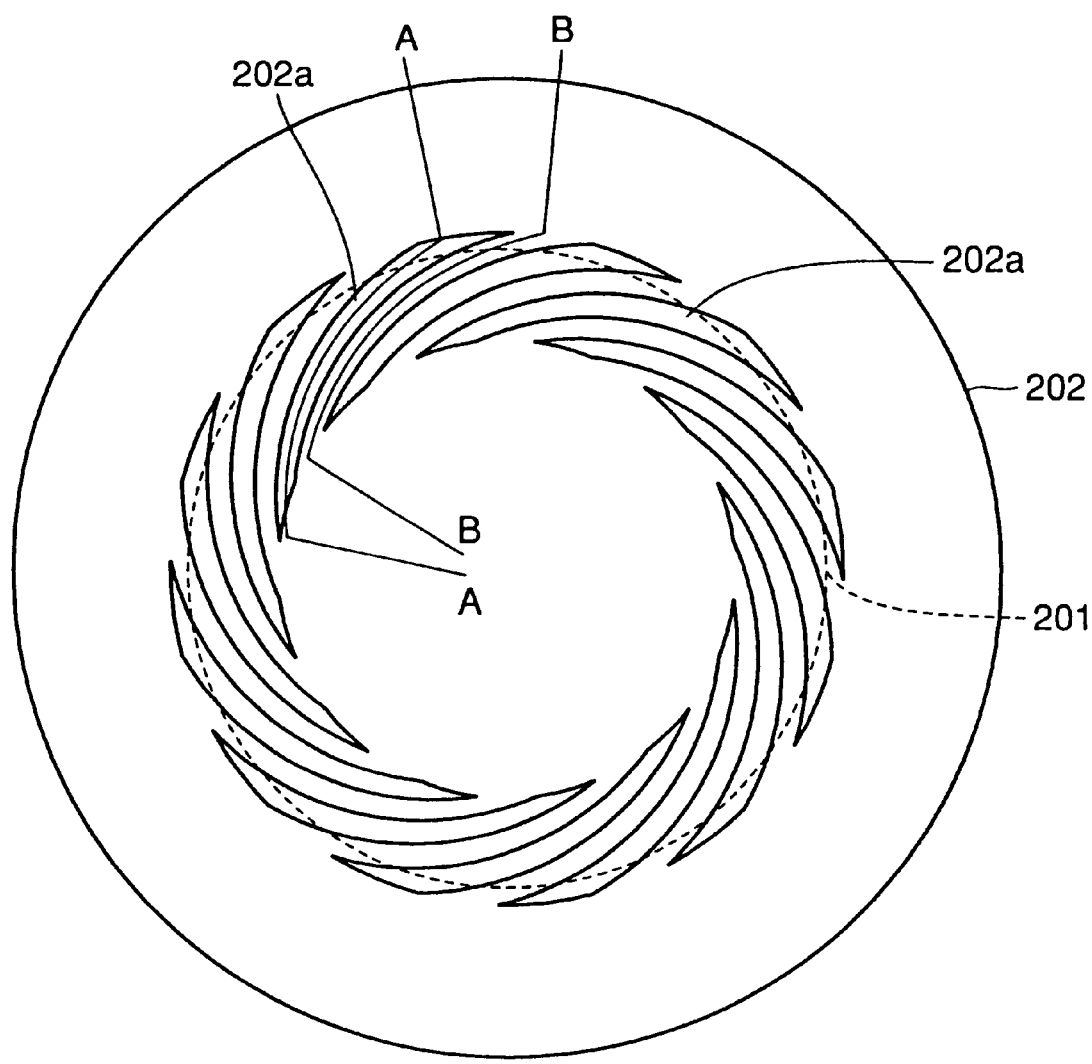
FIG. 5 is a plan view showing that surface of the thrust plate which opposes to a fixed shaft in the hydrodynamic gas bearing structure shown in FIG. 2.

FIG. 5 is a plan view showing that surface of thrust plate 202 which opposes to one end surface of fixed shaft 201.

As can be seen in FIG. 5, the region of thrust plate 202 opposing to fixed shaft 201 is represented as a circle in a dotted line. In the region of the opposing surface of thrust plate 202, a plurality of grooves 202a for generating thrust dynamic pressure are formed arranged in the peripheral direction. Between the plurality of grooves 202a, recessed portions are formed.

Figure 6A:
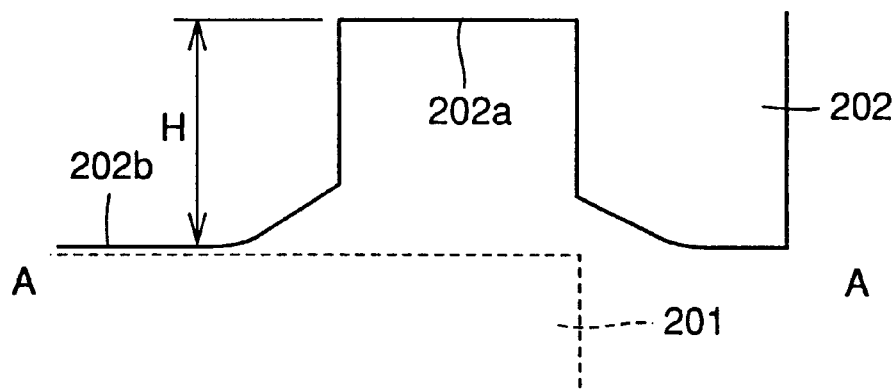
FIG. 6A is a cross section taken along the line A—A of FIG. 5.

Referring to FIG. 6A, on the surface of thrust plate 202 opposing to fixed shaft 201, that is, on the opposing surface, the groove 202a is formed. On the inner peripheral portion of the opposing surface, the protruded portion 202b is formed.

Figure 6B:
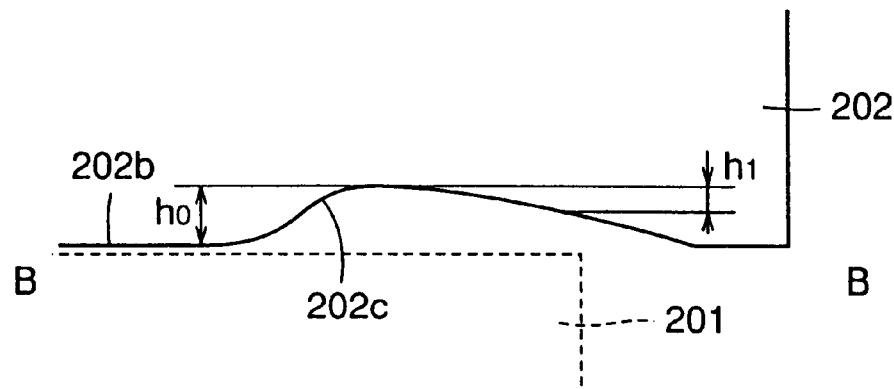
FIG. 6B is a cross section taken along the line B—B of FIG. 5.

Referring to FIG. 6B, the protruded portion is formed on the inner peripheral portion of the opposing surface, and the recessed portion 202c is formed extending from the protruded portion 202b toward the outer peripheral portion. The recessed portion 202c is formed shallower than the groove 202a. The top surface of the protruded portion 202b is at a position of a first height $h_0$ from the bottom of recessed portion 202c. On the outer peripheral portion of the opposing surface, there is formed a portion at a second height $h_1$ lower than the first height $h_0$ from the bottom of recessed portion 202c.

As the protruded portion and recessed portion are formed on the opposing surface of thrust plate 202 as described above, only the protruded portion 202b is in contact with one end surface of fixed shaft 201 in the stationary state. When rotation is to be started, dynamic pressure is generated as the space between the thrust plate 202 and the fixed shaft 201 is small at the portion positioned at the second height $h_1$ at the outer peripheral portion of the opposing surface, so that thrust plate 202 starts floating above fixed shaft 201 at a small number of rotation. Therefore, the torque necessary for starting rotation can be reduced, and wear of the protruded portion 202b positioned at the inner peripheral portion can be reduced.

Though grooves in spiral shape are formed for generating thrust dynamic pressure on the opposing surface of thrust plate 202 in the above described embodiment, grooves of other shapes may be formed provided that the thrust dynamic pressure can be generated. Further, in order to generate radial dynamic pressure, a groove may be formed on at least the outer peripheral surface of the fixed shaft 201 or the inner peripheral surface of sleeve 203.

EXAMPLE 1

Samples of hydrodynamic gas bearing structure in accordance with the first embodiment shown in FIGS. 1, 3 and 4 were fabricated. Referring to FIG. 1, outer diameter and inner diameter of sleeve 103 were set to 18 mm and 10 mm, respectively. Referring to FIG. 3, diameter of a circle with which the outer peripheral end of each thrust dynamic pressure generating groove 102a formed in thrust plate 102 contacted was set to 17.8 mm, and diameter of a circle with which an inner peripheral end of each thrust dynamic pressure generating groove 102a contacted was set to 12 mm. Referring to FIG. 4A, the depth H of the thrust dynamic pressure generating groove 102a formed in thrust plate 102 was set to 5 $\mu$m. Silicon nitride sintered body was employed as the material of fixed shaft 101 and sleeve 103. Further, thrust plate 102 was also formed of silicon nitride sintered body.

Figure 7:
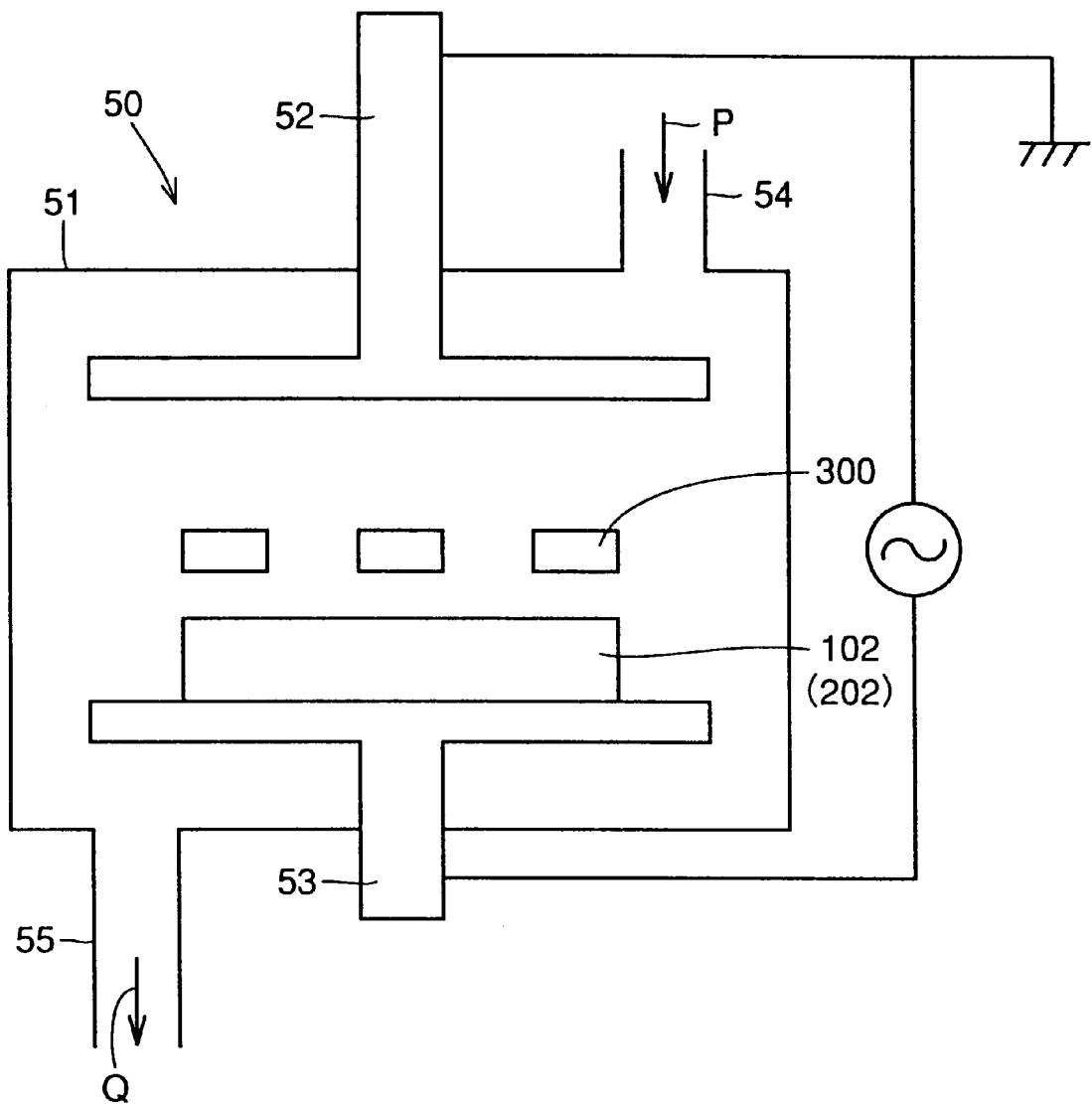
FIG. 7 schematically represents a reactive ion etching apparatus used for forming the dynamic pressure generating groove, the protruded portion and the recessed portion on the thrust plate, in accordance with an embodiment of the present invention.

Dynamic pressure generating groove 102a, protruded portion 102b and recessed portion 102c such as shown in FIG. 4 were formed by reactive ion etching. FIG. 7 is a schematic diagram representing a structure of a reactive ion etching apparatus.

Referring to FIG. 7, reactive ion etching apparatus 50 has two electrodes 52 and 53 opposing to each other arranged in a chamber 51. Thrust plate 102 is placed on one electrode 53. A mask 300 formed of stainless steel is arranged above thrust plate 102, with a prescribed space from the surface of thrust plate 102. Mask 300 has openings only at the regions where grooves 102a such as shown in FIG. 3 are to be formed. A gas is evacuated in the direction represented by an arrow Q through an exhaust outlet 55 of chamber 51, so that chamber 51 is set to a reduced pressure state. Then, a reaction gas, in this example, Freon (trade mark) gas and oxygen, is introduced to chamber 51 in the direction represented by an arrow P through a reaction gas inlet 54. By applying a high frequency electric field between the opposing two electrodes 52 and 53 in this state, plasma is generated in chamber 51, generating fluorine radicals. Thrust plate 102 formed of silicon nitride sintered body is etched by the fluorine radicals.

Here, by adjusting the gap between mask 300 and thrust plate 102, it is possible to etch regions of thrust plate 102 other than the region where grooves 102a are to be formed. In this manner, simultaneously with the formation of thrust dynamic voltage generating groove 102a shown in FIG. 4A, caldera-shaped protruded portion 102b and recessed portion 102c can be formed as shown in FIG. 4B.

By etching of thrust plate 102 utilizing the above described reactive ion etching, the dynamic pressure generating grooves 102a having the depth H of 5 $\mu$m were formed, and in addition, portions of the first height $h_0$ of protruded portions 102b and portions of the second height $h_1$ at the outer peripheral portion of the recessed portion 102c, as specified in Table 1 below, were formed.

In this example, silicon nitride sintered body was used as the material of the thrust plate. Therefore, the grain boundary portion of the silicon nitride cannot be removed by the etching described above. Therefore, in order to prevent residue of the grain boundary portion after etching from being deposited on the surface of the thrust plate, silicon nitride sintered body having low content of grain boundary portion (1.5 to 5 vol %) was used as the material of the thrust plate.

Samples of the hydrodynamic gas bearing structure such as shown in FIG. 1 were provided using a number of thrust plates 102 having protruded portions and recessed portions of different dimensions fabricated in the manner as described above. The weight of the overall rotator including sleeve 103, rotation member 104 and rotational load 105 was set to 50g. For respective samples of the hydrodynamic gas bearing structure formed in this manner, the torque necessary for starting rotation and the number of rotation (floating rotational number) at which sleeve 103 started floating above thrust plate 102 were measured. The results are as shown in Table 1.

TABLE 1

| No. | 1 | 2 | 3 | 4 | 5 | 6 |
|---|---|---|---|---|---|---|
| Height of protruded portion $h_0$ ($\mu$m) | 2 | 2 | 2 | 2 | 2 | 0 |
| Height of outer periphery $h_1$ ($\mu$m) | 0 | 0.5 | 1 | 1.5 | 2 | 0 |
| Starting torque (gmm) | 25 | 25 | 25 | 25 | 60 | 60 |
| Floating rotational number | 6200 | 4300 | 3300 | 2200 | 2000 | 1900 |

As is apparent from Table 1, when the height $h_0$ of the protruded portion 102b was set to 2 $\mu$m, the torque necessary for starting rotation could be reduced and the floating rotational number could be reduced by setting the height $h_1$ of the outer peripheral portion at 1.5 $\mu$m (No. 4). By contrast, when the height $h_0$ of the protruded portion and height $h_1$ of the outer peripheral portion were set to the same height (2 $\mu$m) (No. 5), the torque necessary for starting rotation was increased. When the protruded portion 102b and recessed portion 102c such as shown in FIG. 4B were not formed (No. 6), that is, when the height $h_0$ of the protruded portion and the height $h_1$ of the outer peripheral portion were 0 $\mu$m, the torque necessary for starting rotation was increased, though floating rotational number could be reduced.

In Nos. 1 to 3 of Table 1, wear is likely at the region of the protruded portions of the thrust plate when starting/stopping of rotation is repeated frequently. In Nos. 5 and 6 of Table 1, large torque is necessary for starting rotation, and hence starting is difficult. Sample No. 4 exhibited the most preferable result.

EXAMPLE 2

Samples of the hydrodynamic gas bearing structure in accordance with the second embodiment shown in FIGS. 2, 5 and 6 were fabricated. Referring to FIG. 2, outer diameter of sleeve 203 was set to 18 mm and inner diameter was set to 13 mm. Referring to FIG. 6A, the depth H of thrust dynamic pressure generating groove 202a formed in thrust plate 202 was set to 5 $\mu$m. Referring to FIG. 5, diameter of a circle with which an outer peripheral end of dynamic pressure generating groove 202a of thrust plate 202 contacted was set to 13.2 mm, and diameter of a circle with which an inner peripheral end of thrust dynamic pressure generating groove 202a contacted was set to 9 mm. Silicon nitride sintered body was used as the material of fixed shaft 201, thrust plate 202 and sleeve 203. As shown in FIGS. 6A and 6B, thrust dynamic pressure generating groove 202a, protruded portion 202b and recessed portion 202c were formed at thrust plate 202 by reactive ion etching, in the similar manner as in Example 1.

Referring to FIG. 2, weight of the overall rotator including thrust plate 202, sleeve 203 and rotational load 204 was set to 50g. Samples of the hydrodynamic gas bearing structure such as shown in FIG. 2 were formed by using a number of thrust plates 202 having protruded portions and recessed portions of different dimensions. For respective samples of the hydrodynamic gas bearing structure provided in this manner, the torque necessary for starting rotation and floating rotational number were measured in the similar manner as in Example 1. The results are as shown in Table 2.

TABLE 2

| No. | 7 | 8 | 9 | 10 | 11 | 12 |
|---|---|---|---|---|---|---|
| Height of protruded portion $h_0$ ($\mu$m) | 2 | 2 | 2 | 2 | 2 | 0 |
| Height of outer periphery $h_1$ ($\mu$m) | 0 | 0.5 | 1 | 1.5 | 2 | 0 |
| Starting torque (gmm) | 5 | 5 | 5 | 5 | 25 | 25 |
| Floating rotational number | 5500 | 4200 | 3100 | 1700 | 1500 | 1400 |

As can be seen from Table 2, similar results as in Example 1 were obtained.

EXAMPLE 3

Samples of hydrodynamic gas bearing structure were fabricated in the similar manner as in Example 2, except that alumina was used as the material of fixed shaft 201, thrust plate 202 and sleeve 203. Accordingly, to form dynamic pressure generating grooves 202a, protruded portions 202b and recessed portions 202c on thrust plate 202, chlorine gas was used as reaction gas of reactive ion etching.

The torque necessary for starting rotation and floating rotational number were measured for respective samples of the hydrodynamic gas bearing structure. The results are as shown in Table 3.

TABLE 3

| No. | 13 | 14 | 15 | 16 | 17 | 18 |
|---|---|---|---|---|---|---|
| Height of protruded portion $h_0$ ($\mu$m) | 2 | 2 | 2 | 2 | 2 | 0 |
| Height of outer periphery $h_1$ ($\mu$m) | 0 | 0.5 | 1 | 1.5 | 2 | 0 |
| Starting torque (gmm) | 5 | 5 | 5 | 5 | 25 | 25 |
| Floating rotational number | 5800 | 4800 | 3400 | 2100 | 1600 | 1500 |

As can be seen from Table 3, similar results as in Example 2 were obtained. Since alumna was employed as the material of thrust plate 202, the surface of the thrust plate was formed a little rough, and hence measurements of the floating rotational number were little larger than those of Example 2.

EXAMPLE 4

Samples of hydrodynamic gas bearing structure were fabricated in the similar manner as in Example 3. In this example, in order to form dynamic pressure generating grooves 202a, protruded portions 202b and recessed portions 202c on thrust plate 202, shot blasting and polishing were performed on thrust plate 202 formed of alumina, and grooves, protruded portions and recessed portions of prescribed shapes were formed.

The torque necessary for starting rotation and the floating rotational number were measured for respective samples of the hydrodynamic gas bearing structure in the similar manner as in Example 3. The results are as shown in Table 4.

TABLE 4

| No. | 19 | 20 | 21 | 22 | 23 | 24 |
|---|---|---|---|---|---|---|
| Height of protruded portion $h_0$ ($\mu$m) | 2 | 2 | 2 | 2 | 2 | 0 |
| Height of outer periphery $h_1$ ($\mu$m) | 0 | 0.5 | 1 | 1.5 | 2 | 0 |
| Starting torque (gmm) | 5 | 5 | 5 | 5 | 25 | 25 |
| Floating rotational number | 5400 | 4300 | 3000 | 1400 | 1400 | 1400 |

As can be seen from Table 4, similar results as in Example 2 were obtained.

Though silicon nitride sintered body or alumina sintered body was used as the material of the thrust plate in the examples above, other ceramic materials, hard materials and the like may be used. Though spiral shaped dynamic pressure generating grooves are formed in the thrust plate, the grooves for generating dynamic pressure may have other shapes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hydrodynamic gas bearing structure, comprising:
    a shaft body;
    a hollow cylindrical bearing body opposing to the shaft body with a radial space kept therebetween; and
    a plate-shaped member having an opposing surface opposing to an end surface in axial direction of one of said shaft body and said bearing body; wherein
    the opposing surface of said plate-shaped member has a groove for generating dynamic pressure between said plate-shaped member and one of said shaft body and said bearing body, a protruded portion formed at an inner peripheral portion, and a recessed portion formed shallower than said groove, extending from the protruded portion toward an outer peripheral portion, and
    top surface of said protruded portion is at a position of a first height from the bottom of said recessed portion, and an outer peripheral portion of said opposing surface includes a portion positioned at a second height lower than said first height from the bottom of said recessed portion.

2. The hydrodynamic gas bearing structure according to claim 1, wherein an end surface of the axial direction of said bearing body opposes to said opposing surface positioned at the outer peripheral portion of said plate-shaped member, and an end surface of the axial direction of said shaft body is attached to said plate-shaped member at a surface positioned closer to the inner periphery than said opposing surface.

3. The hydrodynamic gas bearing structure according to claim 1, wherein an end surface of the axial direction of said shaft body opposes to said opposing surface positioned at the inner peripheral portion of said plate-shaped member, and an end surface of the axial direction of said bearing body is attached to said plate-shaped member at a surface positioned closer to the outer periphery than said opposing surface.

4. The hydrodynamic gas bearing structure according to claim 1, wherein said shaft body is fixed and said bearing rotates.

5. The hydrodynamic gas bearing structure according to claim 1, wherein said groove includes a plurality of said grooves formed arranged in a peripheral direction on said opposing surface, and said recessed portion is formed between the plurality of grooves.

6. The hydrodynamic gas bearing structure according to claim 1, wherein said plate-shaped member is formed of ceramics.

7. The hydrodynamic gas bearing structure according to claim 6, wherein said ceramics is silicon nitride.

8. The hydrodynamic gas bearing structure according to claim 6, wherein said ceramics is alumina.

* * * * *